(12) United States Patent
Robinson (10) Patent No.: US 7,900,939 B2
(45) Date of Patent: Mar. 8, 2011

(54) WHEELBARROW

(76) Inventor: Douglas Robinson, Dallas, TX (US)

( * ) Notice: Subject to any disclaimer, the term of this patent is extended or adjusted under 35 U.S.C. 154(b) by 444 days.

(21) Appl. No.: 11/765,364

(22) Filed: Jun. 19, 2007

(65) Prior Publication Data

US 2007/0296166 A1    Dec. 27, 2007

Related U.S. Application Data

(63) Continuation-in-part of application No. 10/989,808, filed on Nov. 16, 2004, now Pat. No. 7,232,135.

(51) Int. Cl.
*B62B 7/02* (2006.01)
*B62B 1/00* (2006.01)

(52) U.S. Cl. .............. 280/47.31; 280/47.32; 280/63; 280/78; 280/47.24; 280/653; 280/654

(58) Field of Classification Search ......... 280/47.31, 280/47.3, 47.24, 47.32, 78, 63, 652, 653, 280/654
See application file for complete search history.

(56) References Cited

U.S. PATENT DOCUMENTS

| 392,150 | A | * | 10/1888 | Fouzer ............................ 301/1 |
| 686,262 | A | * | 11/1901 | Cone et al. ................. 280/47.31 |
| 944,291 | A | * | 12/1909 | Spangler ..................... 280/47.18 |
| 1,965,409 | A | * | 7/1934 | Forrer ......................... 280/47.31 |
| 1,969,457 | A | * | 8/1934 | Forrer ......................... 280/47.31 |
| 2,221,834 | A | * | 11/1940 | Garlinghouse ............. 280/47.31 |
| 3,282,600 | A | * | 11/1966 | Tonelli ........................ 280/47.31 |
| 4,261,590 | A | * | 4/1981 | Schupbach ................. 280/47.31 |
| 4,270,786 | A | * | 6/1981 | Mattox ............................. 298/3 |
| 5,749,588 | A | * | 5/1998 | Stallbaumer ............... 280/47.27 |
| 5,758,887 | A | * | 6/1998 | Bobst ......................... 280/47.31 |
| 6,851,739 | B2 | * | 2/2005 | Morley ......................... 296/102 |
| 2003/0011154 | A1 | * | 1/2003 | Scott et al. ................. 280/47.31 |
| 2003/0201616 | A1 | * | 10/2003 | Friel .......................... 280/47.31 |

FOREIGN PATENT DOCUMENTS

GB    2220391 A  *  1/1990

* cited by examiner

*Primary Examiner* — J. Allen Shriver, II
*Assistant Examiner* — John R Olszewski (57) ABSTRACT

A wheelbarrow configurable as a kit for a wheelbarrow having a first and second side frames defining two laterally spaced-apart longitudinal portions, to which an axle is mounted with a wheel rotatably mounted thereto, and to which a body, such as a tub or flat bed, is mounted for carrying a load. The side frames are capable of being connected to leg structures, each of which includes a straight base portion configured for aligning with and engaging the ground. Forward cross-braces are capable of being connected from a forward end of each base portion to a first point on the main frame, and rearward cross-braces are capable of being connected from a rearward end of each base portion to a second point on the main frame proximately adjacent to the first point. A lateral member is capable of extending from longitudinal portions of the side frames, and a lateral cross brace is capable of extending from each leg structure to the lateral member.

20 Claims, 7 Drawing Sheets

WHEELBARROW

CROSS-REFERENCE TO RELATED APPLICATION

This application is a continuation-in-part of U.S. Pat. No. 7,232,135, formerly patent application Ser. No. 10/989,808, filed on Nov. 16, 2004, and issued on Jun. 19, 2007, which patent is incorporated herein by reference in its entirety.

TECHNICAL FIELD

The invention relates generally to wheelbarrows and, more particularly, to a structural frame effective for use with a wheelbarrow.

BACKGROUND

The use of wheelbarrows of various designs and configurations is known in the prior art. More specifically, wheelbarrows of various designs and configurations heretofore devised and utilized for the purpose of improving the stability of wheelbarrows by using improved frames are known to consist basically of familiar, expected, and obvious structural configurations, notwithstanding the myriad of designs encompassed by the crowded prior art which has been developed for the fulfillment of countless objectives and requirements.

There are nonetheless, a number of drawbacks still associated with conventional wheelbarrows. For example, if conventional wheelbarrows are used to carry very substantial loads, they tend to be instable (resulting in a tendency for the wheelbarrow to tip over during use), unreliable, and have relatively short life expectancies. Accordingly, continuing research has been directed to the development of wheelbarrows having relatively substantial load bearing capabilities which are also more rigid and reliable than conventional wheelbarrows, and also have longer life expectancies than convention wheelbarrows.

SUMMARY

The present invention, accordingly, provides a wheelbarrow having a main frame defining first and second spaced-apart longitudinal portions. An axle is mounted on the main frame, and a wheel is rotatably mounted on the axle. A body, such as a tub or flat bed, is mounted to the main frame for supporting and carrying a load. A first leg structure is attached to the first longitudinal portion of the main frame, and includes a substantially straight base portion configured for aligning with and engaging ground when the wheelbarrow is placed in a stationary position. Similarly, a second leg structure is attached to the second longitudinal portion of the main frame, and includes a substantially straight base portion configured for aligning with and engaging ground when the wheelbarrow is in placed a stationary position.

In one embodiment, cross-bracing is provided extending from each end of each base portion of each leg structure to the main frame.

In another embodiment of the invention, the main frame, first leg structure, and second leg structure are fabricated from tubular steel, and are welded together.

In another embodiment, a lateral member is positioned to extend between the first and second longitudinal portions of the main frame, and lateral cross braces are positioned to extend from the lateral member to the first and second leg structures.

In another embodiment, the main frame extends to define laterally spaced-apart rearwardly extending handles.

In another embodiment, body support members extend from the longitudinal portions of a forward portion of the main frame to form a first substantially triangular structure effective for supporting the body. A transverse member is preferably also connected between the triangular structures for reinforcing support of the body.

In yet another embodiment of the invention, the wheelbarrow is configured as a kit wherein first and second side frames are coupled together. The first side frame comprises a first longitudinal portion and a first leg structure attached to the first longitudinal portion of the first frame, which first leg structure includes a substantially straight base portion configured for aligning with and engaging ground when the wheelbarrow is in a stationary position. The second side frame comprises a second longitudinal portion and a second leg structure attached to the second longitudinal portion of the second frame, which second leg structure includes a substantially straight base portion configured for aligning with and engaging ground when the wheelbarrow is in a stationary position. A lateral member is capable of being coupled between the first longitudinal portion of the first side frame and the second longitudinal portion of the second side frame. A first lateral cross brace is capable of being coupled between the rearward portion of the first leg structure and the lateral member, and a second lateral cross brace is capable of being coupled between the rearward portion of the second leg structure and the lateral member. At least one axle is capable of being mounted to the first and second side frames, and at least one wheel is capable of being mounted onto the at least one axle, so that the at least one wheel is rotatable relative to the first and second side frames. A body capable of being removably mounted to the first and second side frames for supporting the load.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning welded connections and the like have been omitted inasmuch as such details are not considered necessary to obtain a complete understanding of the present invention, and are considered to be within the skills of persons of ordinary skill in the relevant art.

It is noted that structural members depicted herein are preferably tubular members, though they may alternatively comprise other cross-section configurations such as square, rectangular, triangular, I-beam, U-beam, and the like. Structural members are preferably welded together, though any suitable means or combination of means, such as bolting, may be employed to join members together. The structural members may be fabricated from any of a number of different materials, such as steel, aluminum, or the like.

For definitional purposes, the following terms will be used for referring to the fully assembled wheelbarrow in normal use. The term "horizontal" refers to the direction parallel to a surface (e.g., ground) on which the wheelbarrow is supported in normal use. The term "vertical" refers to a direction substantially perpendicular to the horizontal direction. The term "front" or "forward" refers to the end of the wheelbarrow proximate to the wheel (described below) of the wheelbarrow. The term "rear" or "rearward" refers to the end opposite the front end of the wheelbarrow. The term "point" refers to an area approximating the size of a cross-section of a member proximate to the "point".

Figure 1:
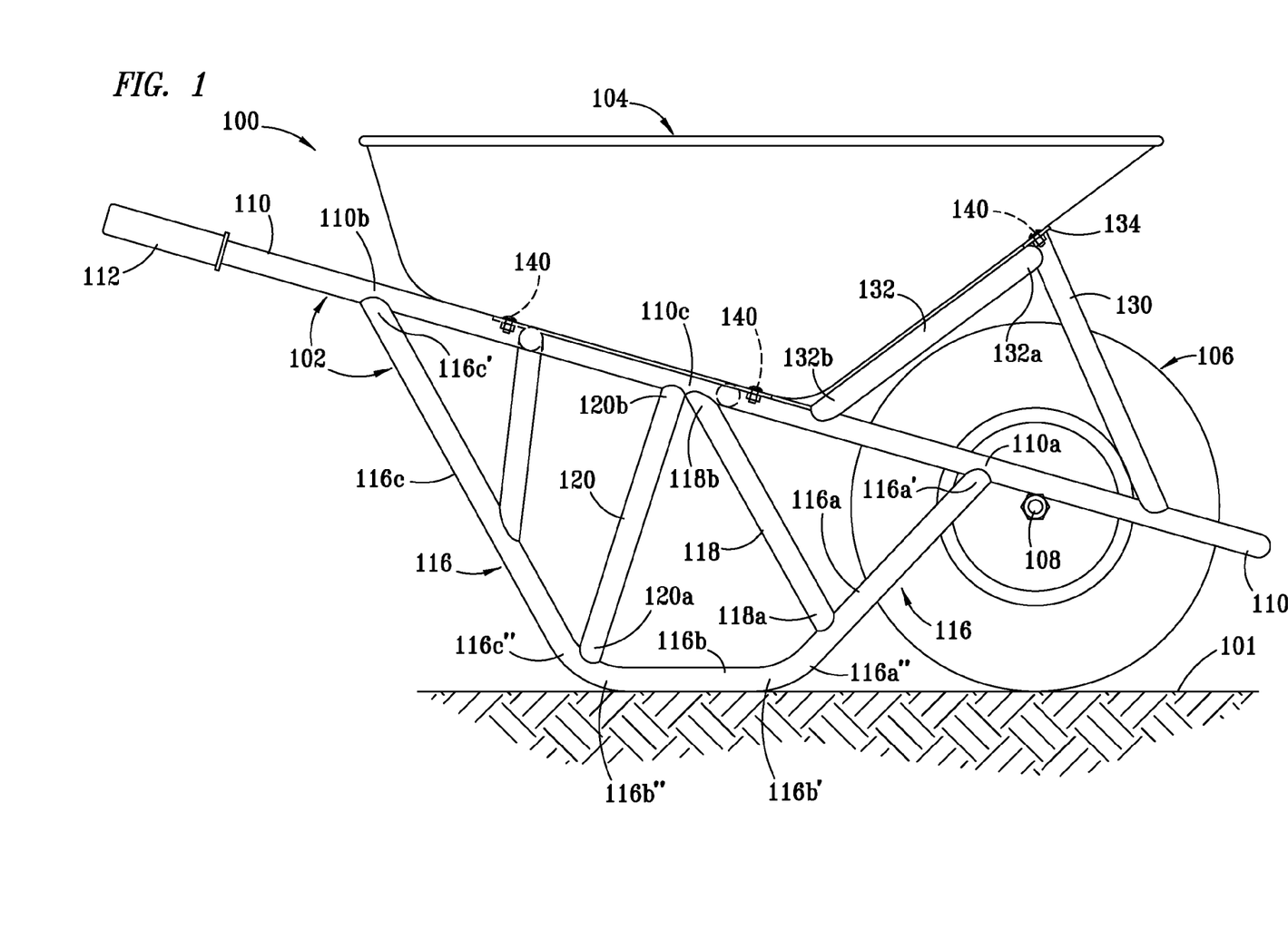
FIG. 1 is a side elevation view of a wheelbarrow embodying features of the present invention.

Referring to FIG. 1 of the drawings, the reference numeral 100 generally designates a wheelbarrow embodying features of the present invention. The wheelbarrow 100 includes a main frame 102 configured for supporting a body 104 (e.g., a tub or flat bed). The main frame 102 further includes an axle 108 on which a wheel and tire 106 are axially mounted for facilitating movement of the wheelbarrow by a person in a conventional manner.

The frame 102 includes a longitudinal portion 110 which extends generally through the length of the wheelbarrow 100. As shown more clearly in FIG. 4, the longitudinal portion 110 preferably wraps less than 180° around the wheel and tire 106, and two ends of the longitudinal portion 110 extend rearwardly from an opposing end of the wheel and tire 106 of the wheelbarrow 100 to form handles, to each of which handles handgrips are preferably positioned, the handgrips preferably comprising a material, such as rubber, nylon, or the like, that is effective for enabling a person to grasp and lift the rear end of wheelbarrow 100 in a conventional manner.

Figure 4:
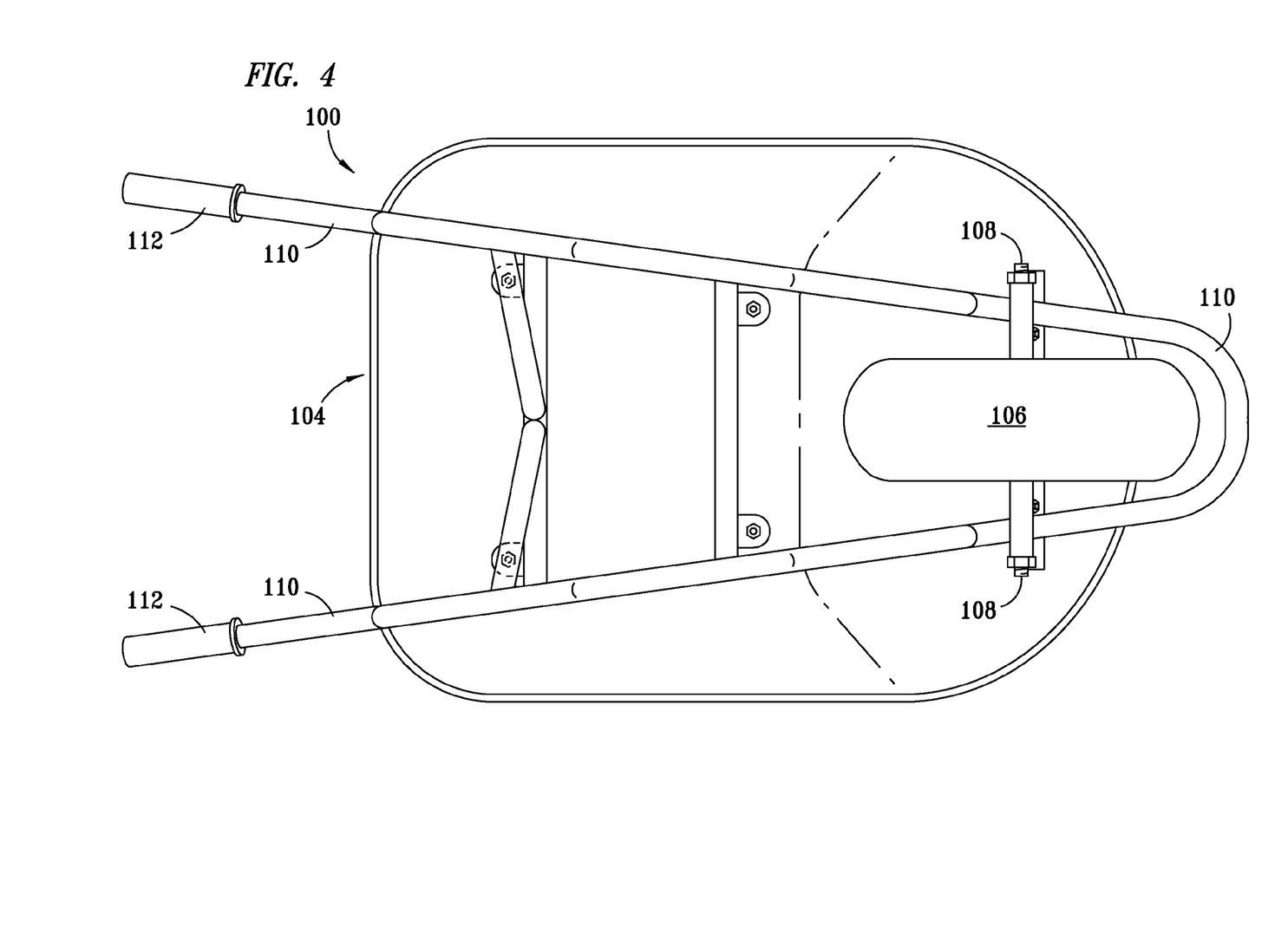
FIG. 4 is a bottom view of the wheelbarrow of FIG. 1.

As also shown in FIG. 4, the wheel and tire 106 are rotatably mounted to the axle 108, which axle is secured to the wheelbarrow 100, by means such as welding. The axle 108 is preferably fabricated from relatively heavy duty material effective for supporting heavy loads (e.g., stone, rocks, and/or brick) in the body 104.

Referring back to FIG. 1, the frame 110 further includes two leg structures 116 (only one of which is shown in FIG. 1). Each leg structure 116 includes a forward portion 116a defining a first end 116a' extending from a point 110a of the longitudinal portion 110 to a second end 116a", a horizontal (as viewed in FIG. 1) base portion 116b having a first end 116b' extending from the second end 116a" of the forward portion 116a to second end 116b", and a rearward portion 116c having a second end 116c" extending from the second end 116b" of the base portion 116b to a first end 116c' secured to a rearward point 110b of the longitudinal portion 110 of the main frame 102.

Two forward cross braces 118 and two rearward cross braces 120 are secured, preferably via welding, between the longitudinal portion 110 and each leg structure 116 to form a substantially triangular truss structure. More specifically, each forward cross brace 118 is preferably secured (e.g., welded) at a first end 118a proximate to the second end 116a" of the forward portion 116a and the first end 116b' of the base portion 116b of each leg structure 116, and is preferably secured (e.g., welded) at a second end 118b proximate to a point 110c interposed between the points 110a and 110b of the respective longitudinal portion 110. Each rearward cross brace 120 is preferably secured (e.g., welded) at a first end 120a proximate to the second end 116b" of the base portion 116b and second end 116c" of rearward portion 116c of each leg 116, and is preferably welded at a second end 120b proximate to the point 110c interposed between the points 110a and 110b of the respective longitudinal portion 110.

Figure 2:
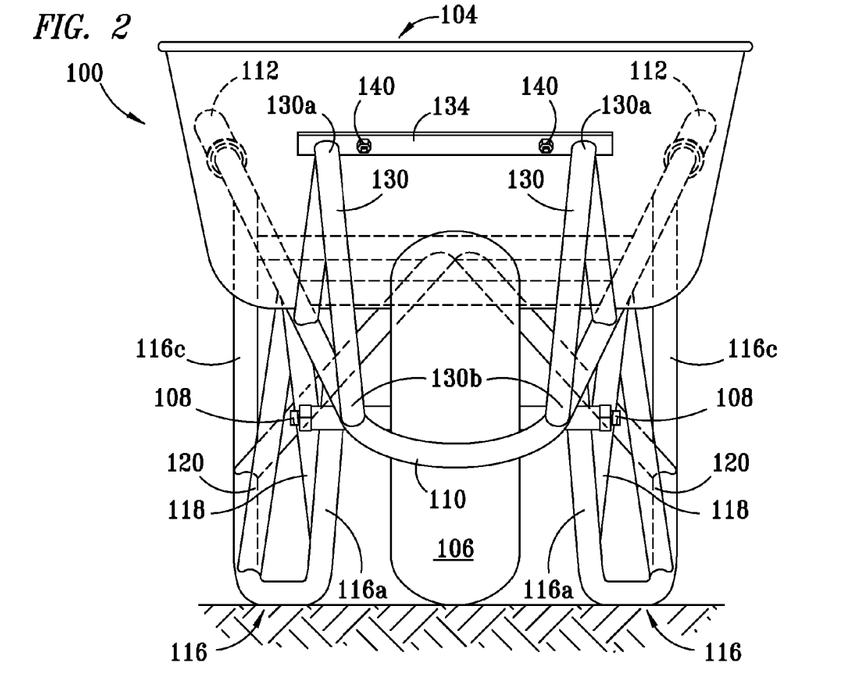
FIG. 2 is a front elevation view of the wheelbarrow of FIG. 1.

In a preferred embodiment, two forward body support members 130 are welded at first ends 130a to a forward portion of the longitudinal portion 110, and two rearward body support members 132 are welded at first ends 132a to the longitudinal portion 110, and second ends 130a and 132b of respective body support members 130 and 132 are welded together to form a substantially triangular structure effective for supporting the body 104. As shown most clearly in FIG. 2, a cross-brace 134 preferably extends proximately between the two first ends 130a, though alternatively could extend proximately between the two first ends 132a, for providing support to the body 104.

The body 104 is secured to the frame 110 in a conventional manner using fasteners, such as bolts and nuts, rivets, and/or the like 140.

Figure 3:
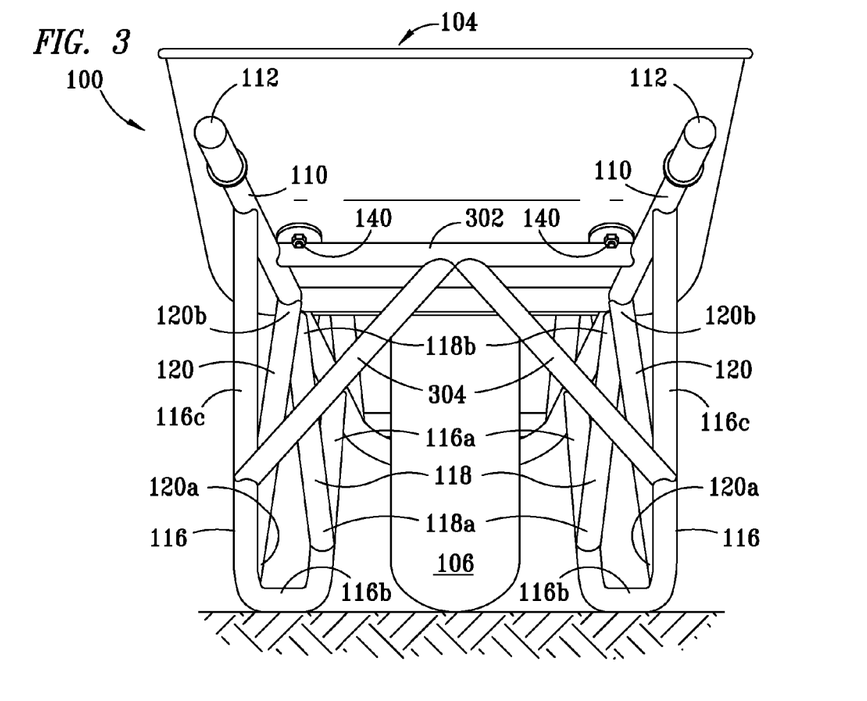
FIG. 3 is a rear elevation view of the wheelbarrow of FIG. 1.

FIG. 3 depicts a rearward support bracing structure preferably incorporated into the main frame 102. More specifically, a lateral member 302 extends between the longitudinal portions 110 of the main frame 102. A first lateral cross brace 304 extends from the rearward portion 116c of one leg structure 116 to the lateral member 302, and a second lateral cross brace 304 extends from the rearward portion 116c of an opposing leg structure 116 to the lateral member 302.

In operation, the wheelbarrow 100 is operable in a "stationary" mode, wherein it positioned substantially as shown in FIG. 1, with the base portions 116b of each leg structure 116 substantially aligned and engaged with a support surface 101, such as the ground, floor, or the like. In the stationary mode, the wheelbarrow 100 may be loaded with stone, brick, dirt, or the like, or the same may be unloaded from the wheelbarrow. The wheelbarrow 100 is also operable in a "mobile" mode, wherein a person (not shown) may grip the handles 112 and lift the rear portion of the wheelbarrow 100, and then move the wheelbarrow as desired to a new location. When the new location is reached, then rear portion of the wheelbarrow 100 may be lowered and restored to a stationary mode. Because the operation of a wheelbarrow is considered to be well-known, its operation will not be described in further detail herein.

Figure 5:
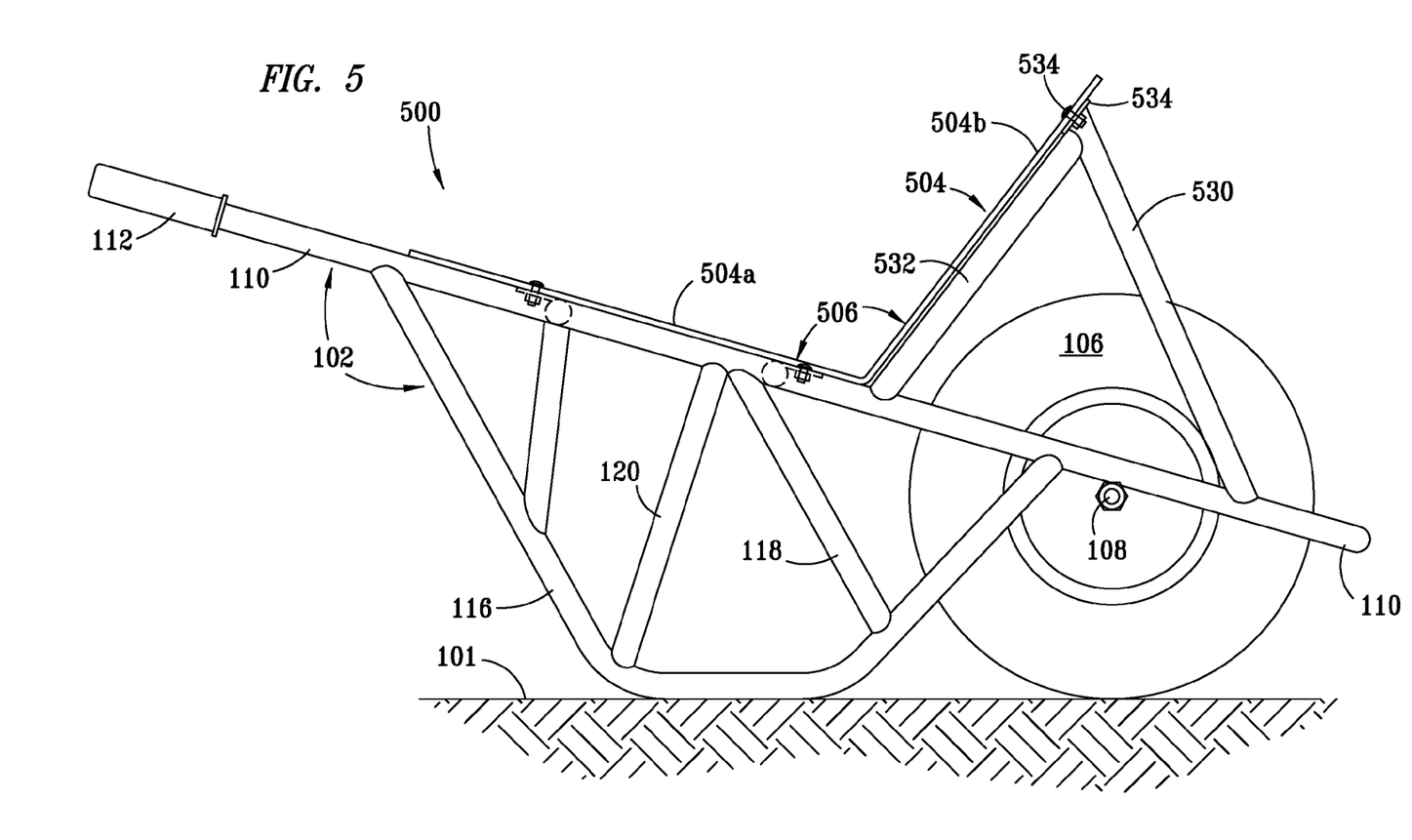
FIG. 5 is a side elevation view of an alternative embodiment of a wheelbarrow embodying features of the present invention.

In FIG. 5, the reference numeral 500 designates an alternative embodiment of the invention adapted for a body comprising a flat bed. To that end, the main frame 102 is configured substantially as depicted above with respect to FIG. 104, but for the forward body support structure members 130 and 132, which are preferably reconfigured as two forward body support members 530 (only one of which is shown in FIG. 5), two rearward body support members 532 (only one of which is shown in FIG. 5), and cross-brace 534 interconnected therebetween, which rearward body support members 532 are positioned at an angle 506 (discussed below) more suitable for supporting a flat bed 504 rather than a tub. The flat bed 504 includes a lower portion 504a and an upwardly extending portion 504b. An angle 506 between the lower portion 504a and the upwardly extending portion 504b is preferably greater then 90°, such as about 100°, 110°, or the like. Operation of the wheelbarrow 500 is substantially similar to the wheelbarrow 100, but for the step of loading, wherein the flat bed 504 is adapted for more efficiently loading and carrying rectangular-shaped objects and objects having flat surfaces, such as bricks, wood, and the like. It is noted that the main frame depicted in FIGS. 1-4 may alternatively be used with a flat bed, as depicted by FIG. 5, if the space between the member 132 and the flat bed portion 504b is preferably provided with a wedge-shaped spacer (not shown) to thereby attain to the angle 506.

By the use of the present invention heavy loads, such as a load of stones, bricks, dirt, and the like, may be moved using a wheelbarrow that is more rigid, more reliable, and able to greater loads with a greater life expectancy than is possible using wheelbarrows disclosed in the prior art.

FIGS. 6-11 exemplify an alternative embodiment of the invention, which facilitates conservation of space in a disassembled state, and still further, facilitates an embodiment of a wheelbarrow as a "kit" in accordance with principles of the present invention. To facilitate description of the wheelbarrow of FIGS. 6-11, many elements have been designated by reference numerals different from those used above with respect to FIGS. 1-5, though they are functionally or otherwise similar or identical to corresponding elements described above with respect to FIGS. 1-5. For the sake of conciseness, some elements that have been described in some detail with respect to FIGS. 1-5 above, and that are functionally similar or identical, have not been similarly described in further detail in FIGS. 6-11.

Figure 6:
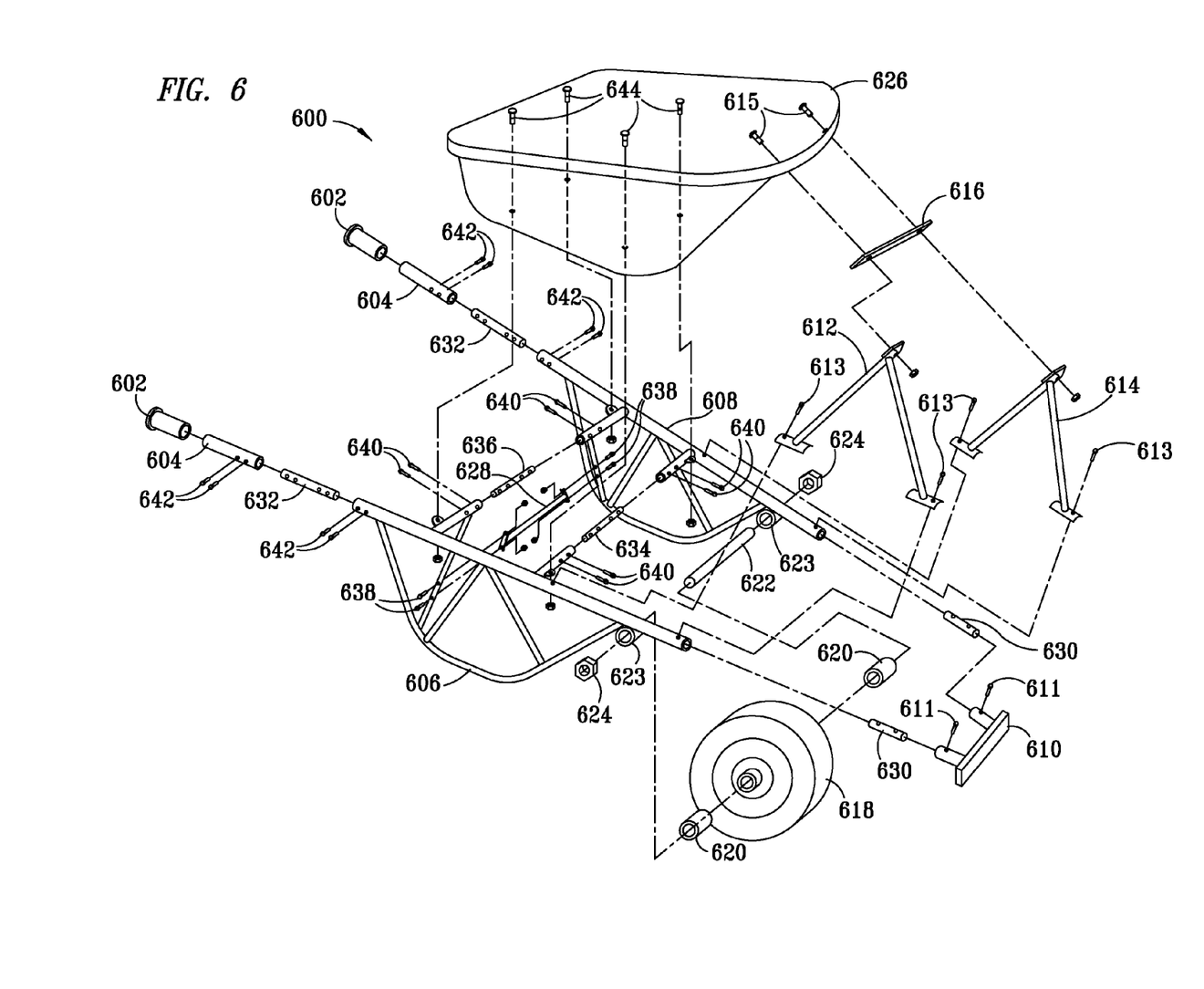
FIG. 6 depicts an exploded view of a wheelbarrow exemplifying features of an alternate embodiment of the invention.

FIG. 6 exemplifies an exploded view of a wheelbarrow, designated by the reference numeral 600. Accordingly, the description of the wheelbarrow 600 will be directed to features that are different from the wheelbarrow 100, and similar features will not be described in detail, except insofar as necessary to describe the invention. As shown in FIG. 6, the wheelbarrow 600 includes left and right side frames 606 and 608, respectively. The side frames 606 and 608 are preferably connected together by way of front and rear fittings (e.g., pipe fittings) 634 and 636, respectively, and a cross-bar 628, which are secured between lateral cross braces of respective side frames by way of mechanical fasteners 640 and 638, such as bolts and nuts.

Handles 604 are preferably attached to rear of the side frames 606 and 608 by way of fittings (e.g., pipe fittings) 632 and mechanical fasteners 642, such as bolts and nuts. Handle grips 602 are preferably fitted to the handles 604. and secured thereto by friction, though a conventional adhesive (not shown) may be employed for same.

A nose piece 610 is preferably fitted to the front ends of the side frames 606 and 608 by way of fittings 630 (e.g., pipe fittings) and fasteners 611. Left and right body supports 612 and 614 (previously referred to as body support members 130 and 132), respectively, are positioned on respective left and right wide frames 606 and 608, respective, and preferably secured thereto by way of fasteners 613, such as bolts and nuts.

A wheel and tire 618 is preferably rotatably mounted on an axle 622 which is extended through the sleeves 623 attached (e.g., by tack welds) to the side frames 606 and 608, and secured thereto by way of nuts 624. A spacer 620 is preferably positioned on the axle 622 on each side of the wheel 618 to keep the wheel substantially centered on the axle.

A tub (or flat bed, as discussed below) 626 is preferably positioned on the side frames 606 and 608 and against the tub supports 612 and 614, and is secured thereto by way of fasteners 614 and 615, such as bolts and nuts. A tub support cross-brace 616 (previously referred to as 134 and 534) is preferably interposed between the tub supports 612 and 614 and tub 626.

FIGS. 7-10 exemplify one method, or sequence of steps, that may be employed in the assembly of a frame for the wheelbarrow of FIG. 6. Accordingly, as exemplified in FIG. 7, the fittings 634 and 636 are inserted into right side frame 606 and secured thereto by way of fasteners 640. A handle fitting 632 (FIG. 6) is also inserted into end of the side frame 606, and a handle 604 and handle grip 602 are attached thereto.

Figure 8:
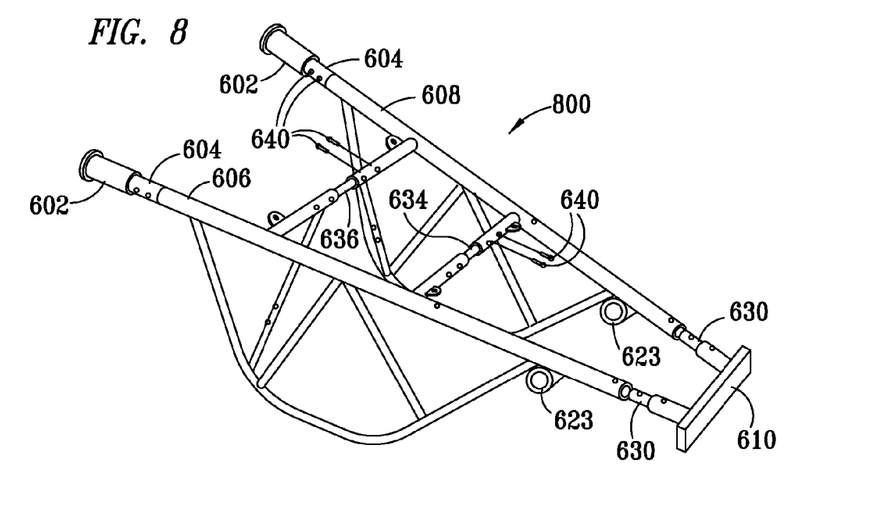

As exemplified in FIG. 8, the left side frame 608 is coupled to the right side frame 606 by way of the fittings 634 and 636 and fasteners 640. A handle fitting 632 (FIG. 6) is also inserted into end of the side frame 608, and a handle 604 and handle grip 602 are attached thereto.

Figure 9:
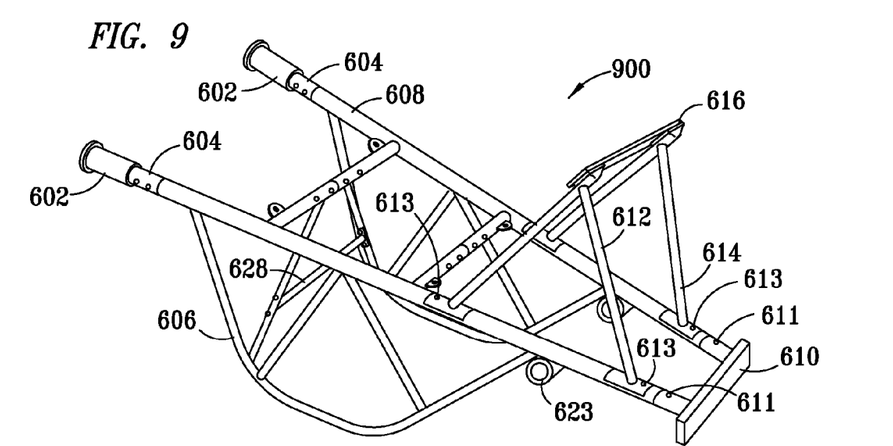

As exemplified in FIG. 9, the right and left side frames 606 and 608 are further secured together by way of the cross-brace 628 and fasteners 638. The tub supports 612 and 614 and nose piece 610 are also positioned onto the side frames 606 and 608, and secured thereto by way of fasteners 613 and 611. The tub support cross-brace 616 is preferably also positioned on the tub supports 612 and 614, and secured thereto by way of fasteners 615 when the tub 626 is attached to the side frames 606 and 608.

Figure 7:
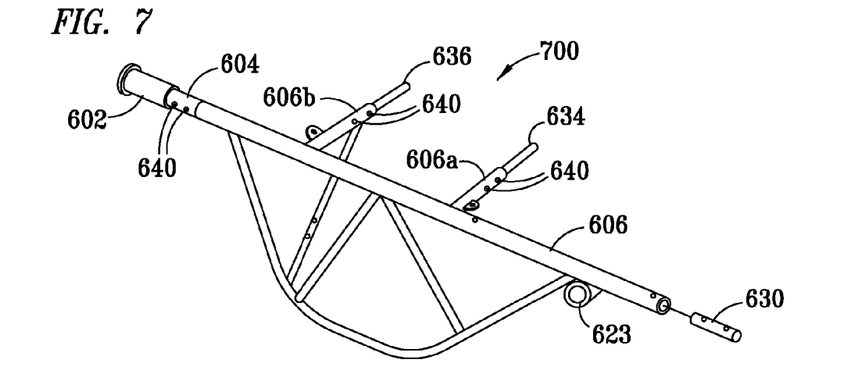
FIGS. 7-10 exemplify a sequence of steps that may be employed in the assembly of the wheelbarrow of FIG. 6.
Figure 10:
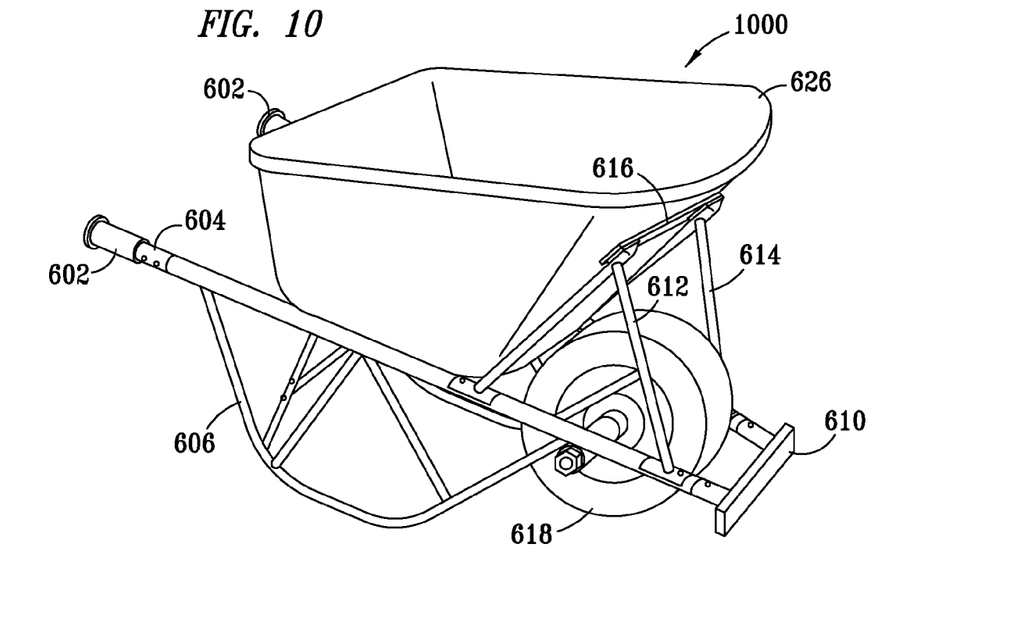

FIG. 10 illustrates a final assembly 1000 of the wheelbarrow of FIGS. 7-9. Accordingly, the tub 626 is positioned on the side frames 606 and 608 and the tub supports 612 and 614, and secured thereto by way of fasteners 644 and 615. The axle 622 is extended through one sleeve 632, one spacer 620, the wheel 618, the second spacer 620, and the second sleeve 632, and is secured thereto by way of nuts 624, to thereby rotatably mount the wheel 618 to the wheelbarrow 600.

Operation of the wheelbarrow 600, once assembled, is substantially similar to the wheelbarrows 100 and 500 discussed above. It is noted that the main frame, as depicted by FIG. 9, may alternatively be used with a flat bed, as depicted by FIG. 5, in which configuration the tub supports 612 and 614 are preferably modified, or alternatively, a wedge-shaped spacer (not shown) is interposed between the tub supports 612 and 614 and the flat bed portion 504b, to thereby substantially attain to the angle 506, discussed above with respect to FIG. 5.

By the use of the alternate embodiment of the present invention exemplified by FIGS. 6-10, in addition to the advantages discussed above with respect to the embodiments of FIGS. 1-5, the wheelbarrow 600 may be provided as a kit or, in a disassembled state, be stored much more compactly than is possible with the embodiments of FIGS. 1-5.

Figure 11:
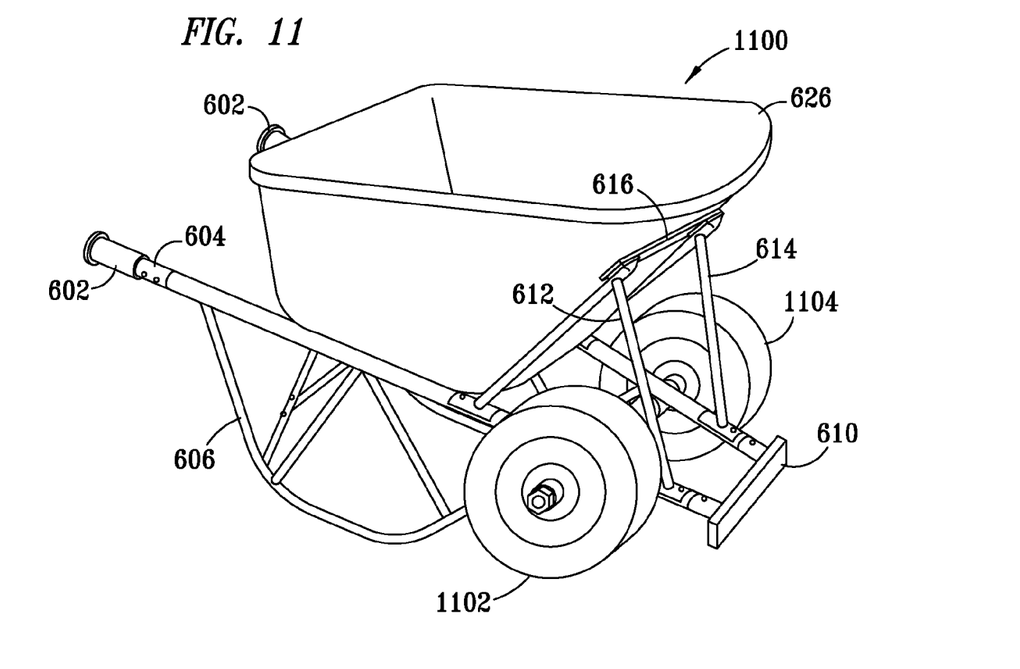
FIG. 11 exemplifies an alternate embodiment of a wheelbarrow configured with two wheels in accordance with principles of the present invention.

FIG. 11 exemplifies a further alternate embodiment of a wheelbarrow of the present invention having two wheels, the wheelbarrow being designated by the reference numeral 1100. The wheelbarrow 1100 is similar to the wheelbarrow 600, but for having two wheels 1102 and 1104 instead of a single wheel 618. More specifically, the axle 622 (FIG. 6) is lengthened to extend beyond the sleeves 623 to thereby accommodate the two wheels 1102 and 1104, one on each outer side of the side frames 606 and 608. It is believed that the details of modifying the wheelbarrow 600 to accommodate two wheels, as exemplified by the wheelbarrow 1100 of FIG. 11, would be apparent to a person having ordinary skill in the art upon a review of the invention as disclosed herein, and will, therefore, not be described in further detail herein.

Operation of the wheelbarrow 1100, once assembled, is substantially similar to the wheelbarrows 100, 500, and 600 discussed above with respect to FIGS. 1-10, and, furthermore, may be configured as a flat bed, as discussed above with respect to FIG. 5.

By the use of the alternate embodiment of the present invention exemplified by FIG. 11, in addition to the advantages discussed above with respect to the embodiments of FIGS. 1-10, the wheelbarrow 1100 may carry heavier loads than is possible with the embodiments of FIGS. 1-10, and still further, provides for enhanced stability during movement of the wheelbarrow, which can be significant when carrying heavy loads.

It is understood that the present invention may take many forms and embodiments. Accordingly, several variations may be made in the foregoing without departing from the spirit or the scope of the invention. For example, the wheel and tire 106 may be supplemented with a second wheel and tire. Each of the portions 116a, 116b, and/or 116c of the leg 116 may constitute separate members that are welded together. An engine may be positioned within the frame 102 under the body 104 for propelling the wheelbarrow, under the guidance of a person. Rear wheels may be provided for the wheelbarrow to enable a person to move the wheelbarrow without lifting the rear end of the wheelbarrow. It is understood, too, that the connection of the forward cross braces 118 to the leg structures 116 may be in closer proximity to the first end 116b' of the base portion 116b of each leg structure 116 than is depicted in FIGS. 1 and 5.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A wheelbarrow comprising:
   a main frame having first and second spaced-apart longitudinal portions;
   at least one axle mounted on said main frame;
   at least one wheel rotatably mounted on said at least one axle;
   a body mounted to said main frame and configured for supporting a load;
   a first leg structure attached to said first longitudinal portion of said main frame, which first leg structure includes a substantially straight base portion configured for aligning with and engaging ground when said wheelbarrow is in a stationary position, a forward portion extending from a first end of said base portion proximate to said at least one wheel to said first longitudinal portion, and a rearward portion extending from a second end of said base portion opposite said first end to said first longitudinal portion;
   a second leg structure attached to said second longitudinal portion of said main frame, which second leg structure includes a substantially straight base portion configured for aligning with and engaging ground when said wheelbarrow is in a stationary position, a forward portion extending from a first end of said base portion proximate to said at least one wheel to said second longitudinal portion, and a rearward portion extending from a second end of said base portion opposite said first end to said second longitudinal portion;
   a lateral member which extends from said first longitudinal portion of said main frame to said second longitudinal portion of said main frame;
   a first lateral cross brace extending from said rearward portion of said first leg structure to said lateral member; and
   a second lateral cross brace extending from said rearward portion of said second leg structure to said lateral member.

2. The wheelbarrow of claim 1 wherein said body comprises a tub.

3. The wheelbarrow of claim 1 wherein said body comprises a substantially flat bed substantially open on at least three sides thereof.

4. The wheelbarrow of claim 1 wherein said first and second side frames, said first leg structure, and second leg structure are fabricated from tubular steel.

5. The wheelbarrow of claim 1 wherein said first longitudinal portion and said first leg structure of first side frame are welded together, and wherein said second longitudinal portion and said second leg structure of second side frame are welded together.

6. The wheelbarrow of claim 1, wherein said base portion of said first leg structure defines a forward end and a rearward end, and wherein said base portion of said second leg structure defines a forward end and a rearward end, said wheelbarrow further comprising:
   a first forward cross brace extending from a point proximate to said forward end of said base portion of said first leg structure to a first point on said first longitudinal portion of said main frame;
   a first rearward cross brace extending from a point proximate to said rearward end of said base portion of said first leg structure to a second point on said first longitudinal portion of said main frame, said first and second points on said first longitudinal portion of said main frame being proximate to one another;
   a second forward cross brace extending from a point proximate to said forward end of said base portion of said second leg structure to a first point on said second longitudinal portion of said main frame; and
   a second rearward cross brace extending from a point proximate to said rearward end of said base portion of said second leg structure to a second point on said second longitudinal portion of said main frame, said first and second points on said second longitudinal portion of said main frame being proximate to one another.

7. The wheelbarrow of claim 1, wherein said main frame further comprises laterally spaced-apart rearwardly extending handles.

8. The wheelbarrow of claim 1, further comprising:
   two first body support members extending from said first longitudinal portion of said main frame and configured to form a first substantially triangular structure effective for supporting said body;
   two second body support members extending from said second longitudinal portion of said main frame and configured to form a second substantially triangular structure effective for supporting said body; and
   a transverse member connected from said first triangular structure to said second triangular structure for reinforcing support of said body.

9. The wheelbarrow of claim 1, wherein said at least one wheel comprises two wheels.

10. A wheelbarrow comprising:
a main frame defining first and second spaced-apart longitudinal portions mechanically coupled together;
at least one axle mounted on said main frame;
at least two wheels rotatably mounted on said at least one axle;
a body mounted to said main frame and configured for supporting a load;
a first leg structure having:
a forward portion having a first end and a second end, said first end of said first forward portion of said first leg structure being secured to a forward point of said first longitudinal portion of said main frame,
a rearward portion having a first end and a second end, said first end of said rearward portion of said first leg structure being secured to a rearward point of said first longitudinal portion of said main frame, and
a base portion extending from said second end of said forward portion of said first leg structure to said second end of said rearward portion of said first leg structure, said base portion of said first leg structure being substantially straight for substantially aligning with and engaging ground along the substantially entire length of the base portion when said wheelbarrow is in a stationary position; and
a second leg structure having:
a forward portion having a first end and a second end, said first end of said second forward portion of said second leg structure being secured to a forward point of said second longitudinal portion of said main frame,
a rearward portion having a first end and a second end, said first end of said second rearward portion of said second leg structure being secured to a rearward point of said second longitudinal portion of said main frame, and
a base portion extending from said second end of said forward portion of said second leg structure to said second end of said rearward portion of said second leg structure, said base portion of said second leg structure being substantially straight for substantially aligning with and engaging ground along the substantially entire length of the base portion when said wheelbarrow is in a stationary position;
a lateral member which extends from said first longitudinal portion of said main frame to said second longitudinal portion of said main frame;
a first lateral cross brace extending from said rearward portion of said first leg structure to said lateral member; and
a second lateral cross brace extending from said rearward portion of said second leg structure to said lateral member.

11. The wheelbarrow of claim 10 wherein said body comprises a tub.

12. The wheelbarrow of claim 10 wherein said body consists essentially of a substantially flat bed defining four sides, one side of which includes a wall extending therefrom.

13. The wheelbarrow of claim 10 wherein said main frame, said first leg structure, and second leg structure are fabricated from tubular steel.

14. The wheelbarrow of claim 10 wherein:
said first end of said forward portion of said first leg structure is welded to said forward point of said first longitudinal portion of said main frame,
said first end of said rearward portion of said first leg structure is welded to said rearward point of said first longitudinal portion of said main frame,
said first end of said forward portion of said second leg structure is welded to said forward point of said second longitudinal portion of said main frame, and
said first end of said rearward portion of said second leg structure is welded to said rearward point of said second longitudinal portion of said main frame.

15. The wheelbarrow of claim 10 further comprising:
a first forward cross brace extending from a point proximate to said second end of said forward portion of said first leg structure proximately to a point interposed between said forward point and said rearward point of said first longitudinal portion of said main frame,
a first rearward cross brace extending from a point proximate to said second end of said rearward portion of said first leg structure proximately to said point interposed between said forward point and said rearward point of said first longitudinal portion of said main frame,
a second forward cross brace extending from a point proximate to said second end of said forward portion of said second leg structure proximately to a point interposed between said forward point and said rearward point of said second longitudinal portion of said main frame, and
a second rearward cross brace extending from a point proximate to said second end of said rearward portion of said second leg structure proximately to said point interposed between said forward point and said rearward point of said second longitudinal portion of said main frame.

16. The wheelbarrow of claim 10, wherein said main frame further comprises laterally spaced-apart rearwardly extending handles.

17. The wheelbarrow of claim 10, further comprising:
two first body support members extending from said first longitudinal portion of said main frame and configured to form a first substantially triangular structure effective for supporting said body;
two second body support members extending from said second longitudinal portion of said main frame and configured to form a second substantially triangular structure effective for supporting said body; and
a transverse member connected from said first triangular structure to said second triangular structure for reinforcing support of said body.

18. A kit for a wheelbarrow, comprising:
a first side frame comprising a first longitudinal portion and a first leg structure attached to said first longitudinal portion of said first frame, which first leg structure includes a substantially straight base portion configured for aligning with and engaging ground when said wheelbarrow is in a stationary position, a forward portion extending from a first end of said base portion proximate to at least one wheel to said first longitudinal portion, and a rearward portion extending from a second end of said base portion opposite said first end to said first longitudinal portion;
a second side frame comprising a second longitudinal portion and a second leg structure attached to said second longitudinal portion of said second frame, which second leg structure includes a substantially straight base portion configured for aligning with and engaging ground when said wheelbarrow is in a stationary position, a forward portion extending from a first end of said base portion proximate to said at least one wheel to said second longitudinal portion, and a rearward portion extending from a second end of said base portion opposite said first end to said second longitudinal portion;

a lateral member capable of being coupled between said first longitudinal portion of said first side frame to said second longitudinal portion of said second side frame;

a first lateral cross brace capable of being coupled between said rearward portion of said first leg structure and said lateral member;

a second lateral cross brace capable of being coupled between said rearward portion of said second leg structure and said lateral member;

at least one axle capable of being removably mounted between said first and second side frames;

said at least one wheel capable of being removably mounted onto said at least one axle so that said at least one wheel is rotatable relative to said first and second side frames; and a body capable of being removably mounted to said first and second frames for supporting said load.

19. The kit of claim 18, wherein said base portion of said first leg structure defines a forward end and a rearward end, and wherein said base portion of said second leg structure defines a forward end and a rearward end, said wheelbarrow further comprising:

a first forward cross brace extending from a point proximate to said forward end of said base portion of said first leg structure to a first point on said first longitudinal portion of said main frame;

a first rearward cross brace extending from a point proximate to said rearward end of said base portion of said first leg structure to a second point on said first longitudinal portion of said main frame, said first and second points on said first longitudinal portion of said main frame being proximate to one another;

a second forward cross brace extending from a point proximate to said forward end of said base portion of said second leg structure to a first point on said second longitudinal portion of said main frame; and a second rearward cross brace extending from a point proximate to said rearward end of said base portion of said second leg structure to a second point on said second longitudinal portion of said main frame, said first and second points on said second longitudinal portion of said main frame being proximate to one another.

20. The kit of claim 18, further comprising a lateral crossbar connectable between said first lateral cross brace and said second lateral cross brace.

* * * * *